Patented June 10, 1941

2,245,131

UNITED STATES PATENT OFFICE 2,245,131

PROCESS OF PREPARING VINYL ESTERS

Willy O. Herrmann, Deisenhofen, and Wolfram Haehnel, Munich, Germany, assignors to Dr. Alexander Wacker Gesellschaft für Elektrochemische Industrie, G. m. b. H., Munich, Germany, a corporation of Germany No Drawing. Application January 17, 1940, Serial No. 314,354. In Germany February 2, 1939

5 Claims. (Cl. 260—476)

This invention relates to the preparation of organic compounds, and more particularly to the preparation of vinyl esters.

This invention has as an object the provision of a process for the preparation of vinyl esters of organic acids. Further objects will appear hereinafter.

These objects are accomplished by the following invention wherein vinyl acetate is heated with an organic acid other than acetic acid and having at least two carbon atoms, i. e., with an organic acid having a boiling point higher than that of acetic acid, preferably in the presence of an ester interchange catalyst, the acetic acid formed being removed by distillation and the vinyl ester formed being isolated from the distillation residue, preferably by distillation.

In the commercial practice of the process of this invention, the mixture of monomeric vinyl acetate, organic acid and, preferably, catalyst is heated under a reflux condenser and then under the reflux column, until the boiling point of the reaction mixture, which has been freed of the low boiling constituents formed in the conversion, has exceeded the boiling point of the acetic acid, in practice until it has gone considerably above this point, and then the newly formed vinyl ester is distilled off. This reaction proceeds in the presence of catalysts, especially mercury salts and the course of the reaction may be influenced and controlled by the addition of suitable reaction media.

While it was surprising even in the process for obtaining low boiling vinyl formate, according to D. R. P. 654,282, that, with the tendency of vinyl esters to polymerize, the extended heating necessary for the production of the vinyl formate did not cause resinification, the method described in the present process would at first seem hopeless, since this process requires strong heating and leads to the formation of higher boiling vinyl esters. It is especially surprising that, nevertheless, this process gives satisfactory results and may even be used with aromatic and unsaturated acids.

According to the process a method is disclosed for preparing more or less difficultly obtainable vinyl esters of different acids from vinyl acetate which today is readily available. Inasmuch as these vinyl esters may be polymerized in the same way as the previously known esters, the present process makes available a whole series of new polymeric products in solid, dissolved, or emulsified form for use in the lacquer, adhesive, insulating material, plastic, molding, safety glass, etc., industries.

The more detailed practice of the invention is illustrated by the following examples, wherein parts given are by weight. There are of course many forms of the invention other than these specific embodiments.

Example I

Vinyl acetate (344 parts), benzoic acid (183 parts), mercuric acetate (5 parts), and concentrated sulfuric acid (0.9 parts) are first heated for some time under reflux and then under a refluxing column until the temperature of the mixture was 140° C. Thus the low boiling constituents of the reaction mixture are gradually driven off. The mixture is then distilled under vacuum to the boiling point of benzoic acid. The crude vinyl benzoate thus obtained is purified by fractional distillation under vacuum. The pure vinyl benzoate distills over at 80° at 12 mm. pressure. The vinyl benzoate has a saponification number of 378 and the following elementary composition:

| Determined | Theoretical | Per cent |
|---|---|---|
| 73.6 | 73.0 | C |
| 5.7 | 5.4 | H |
|  | 21.6 | O |

The vinyl benzoate may be polymerized to polyvinyl benzoate by suitable methods, e. g., by the use of benzoyl peroxide.

A polymerization inhibitor, for example, hydroquinone, although not necessary, may be used in carrying out the process of the present invention and gives somewhat better results.

Example II

Vinyl acetate (430 parts), crotonic acid (430 parts), mercuric acetate (8.5 parts), and 0.85 part of concentrated sulfuric acid are heated according to Example I under a reflux condenser and then in a reflux column until the boiling point of the reaction mixture, after driving off the low boiling constituents, reaches 138°. The mixture was treated according to Example I. The vinyl crotonate thus obtained boils at 45° under 12 mm. pressure. It may also be polymerized.

The process while exemplified above with benzoic acid and crotonic acid is generally applicable to organic acids of at least two carbon atoms other than acetic acid, i. e., to acids boiling higher than acetic acid.

The above description and examples are intended to be illustrative only. Any modification of or variation therefrom which conforms to the spirit of the invention is intended to be included within the scope of the claims.

What is claimed is:

1. Process for the production of monomeric vinyl esters which comprises refluxing monomeric vinyl acetate with an organic carboxylic acid other than acetic acid and having at least two carbon atoms, distilling off the acetic acid formed, and thereafter distilling the monomeric vinyl ester from the residue.

2. Process of claim 1 wherein a catalyst for the reaction is employed.

3. Process of claim 1 wherein a mercuric salt catalyst is employed.

4. Process which comprises refluxing monomeric vinyl acetate with an excess of benzoic acid, distilling off the acetic acid and excess benzoic acid, and distilling vinyl benzoate from the residue.

5. Process which comprises refluxing monomeric vinyl acetate with an excess of crotonic acid, distilling off the acetic acid and excess crotonic acid, and distilling vinyl crotonate from the residue.

WILLY O. HERRMANN.
WOLFRAM HAEHNEL.